Sept. 8, 1959 W. D. BUCKINGHAM 2,903,512

FACSIMILE TELEGRAPH SCANNING APPARATUS

Filed Sept. 8, 1954 4 Sheets-Sheet 1

FIG. I

INVENTOR.
W. D. BUCKINGHAM
BY
W. F. Presson
ATTORNEY

INVENTOR.
W. D. BUCKINGHAM
BY
N F Presson
ATTORNEY

INVENTOR.
W. D. BUCKINGHAM
BY
[signature]
ATTORNEY

Sept. 8, 1959 W. D. BUCKINGHAM 2,903,512

FACSIMILE TELEGRAPH SCANNING APPARATUS

Filed Sept. 8, 1954 4 Sheets-Sheet 4

INVENTOR.
W. D. BUCKINGHAM

BY

ATTORNEY

United States Patent Office 2,903,512

Patented Sept. 8, 1959

2,903,512

FACSIMILE TELEGRAPH SCANNING APPARATUS

William D. Buckingham, Southampton, N.Y., assignor to The Western Union Telegraph Company, New York, N.Y., a corporation of New York Application September 8, 1954, Serial No. 454,750

8 Claims. (Cl. 178—7.1)

This invention relates to facsimile telegraph apparatus employing optical scanning, and especially to an improved system and apparatus for flat-bed scanning of subject matter to be transmitted, although certain features of the optical scanning apparatus disclosed herein are also applicable to a facsimile recorder.

The desirability of optical flat-bed scanning of letters, telegrams or other copy for generating facsimile signals has long been recognized, but in general such scanning systems have been unduly complicated or otherwise impractical, and usually have required complicated mechanical structures and/or expensive lenses in the optical systems.

It is an object of the present invention to provide an inexpensive flat-bed scanning system which is simple in construction and which does not require a large number of moving parts or expensive lenses for the optical system.

Another object is an improved collector system for the scanning light reflected from a message sheet and which provides an increase in the total quantity of the reflected light that can fall on the pickup photocell of the system.

A further object is a collector system in which the light reflected from the message sheet is applied over a large area of the active element of the pickup photocell.

An additional object is to provide means for causing a quick return of the scanning light beam to its initial starting point after each transverse scanning line movement across a sheet either for transmitting or recording purposes.

The machine of my invention embodies inexpensive flat-bed scanning apparatus in which a sheet of paper, cardboard, or the like, bearing subject-matter to be transmitted is scanned by an oscillating beam of light that scans the sheet transversely as the sheet is advanced across a platen to generate facsimile signals. The optical scanning system preferably comprises an incandescent point source of light whose beam is interrupted by a chopper disk to generate a carrier frequency and is reflected by an inexpensive spherical mirror that is oscillated to cause the scanning beam to sweep back and forth across the sheet, scanning being effected only in one direction of movement of the beam. The source of light and also the surface of the subject-matter sheet where the scanning beam impinges are each located so as to be substantially at the optical center of curvature of the spherical mirror. This causes the scanning spot of light that falls on the sheet to have substantially the same diameter as that of the incandescent point source of light, and eliminates the need of expensive lenses for focusing purposes.

After each line scanning sweep of the light beam across the sheet, the beam is returned to its initial position in a time interval much less than that required for the scanning sweep, so that the return or retrace time is but a small part of the scanning time. This scanning system is also applicable to facsimile recorders in which a light-sensitive recording sheet is scanned by a beam of light that is modulated in accordance with incoming facsimile signals.

For transmitting purposes, the density of the light beam reflected from the subject-matter sheet varies in accordance with the density of the subject matter being scanned, and is directed onto one or more photocells, which preferably have elongated light sensitive areas, for generating facsimile signals. In order to provide uniform response for the same tonal density and also to increase the total quantity of light that falls on the photocell or photocells, a cylindrical reflector is employed and is so positioned relative to the photocell structure and the illuminated surface area of the sheet that the light reflected by the cylindrical reflector is focused along a line extending over substantially the entire length of the light-sensitive area or areas of the photocell structure.

The invention will be more fully understood from the following detailed description of an illustrative embodiment thereof, taken in connection with the accompanying drawings in which.

Figure 1:
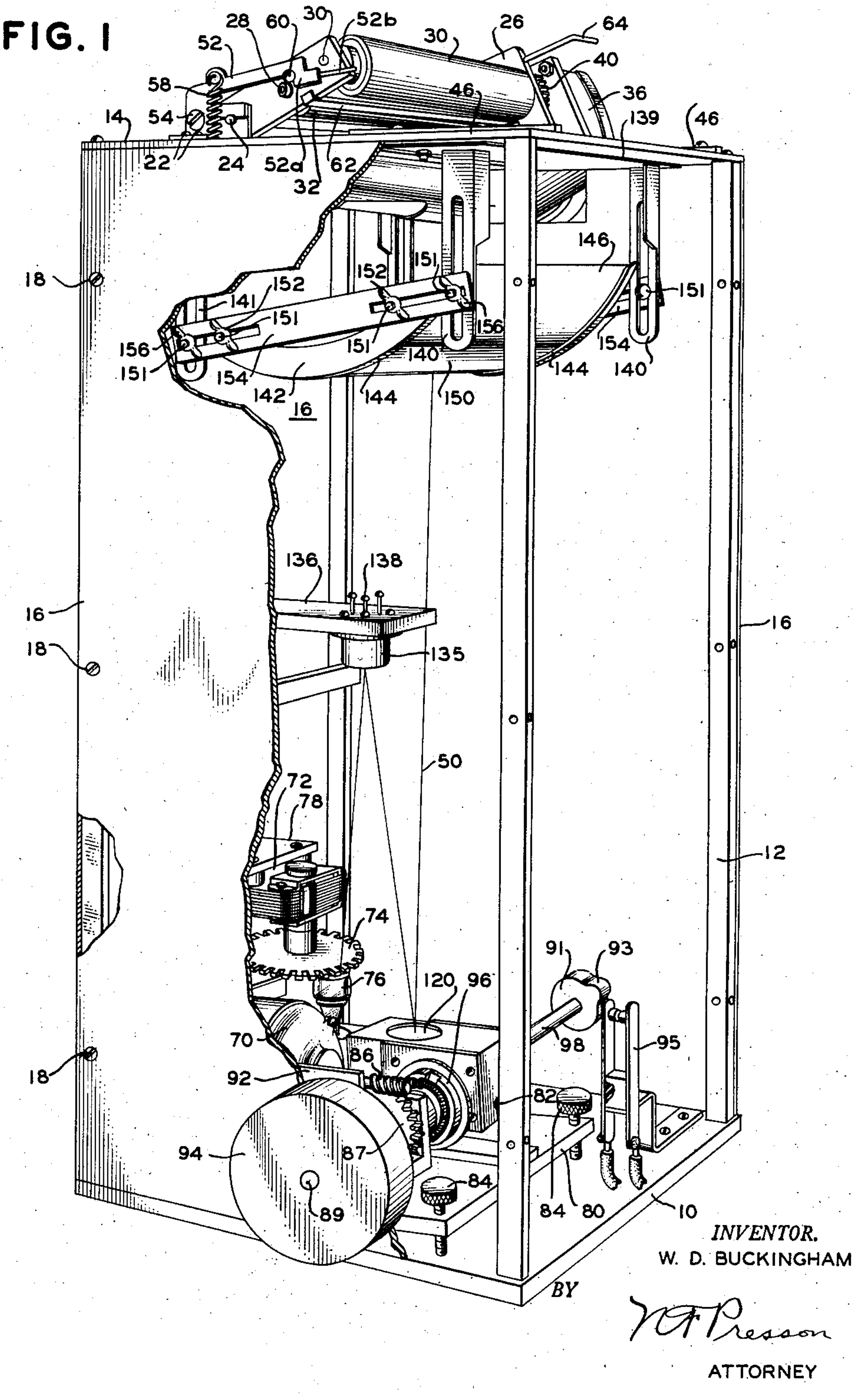
Fig. 1 is a perspective view of a facsimile transmitter constructed in accordance with the principles of the invention, showing message sheet feed rollers in raised position for receiving a sheet to be scanned.

Referring to Figs. 1 to 4, in the embodiment illustrated the optical scanning system is enclosed within a casing, which is substantially light-proof, comprising a rectangular base plate 10 having four corner posts 12 and a top plate 14. Side wall sheets 16, preferably of metal, are removably secured to the corner posts 12 in any suitable manner as by machine screws 18. The top plate 14 has two brackets 20, Fig. 2, secured thereto as by screws 22, and the brackets 20 carry a shaft 24 about which the sheet feeding mechanism of the apparatus is pivotally mounted. Shaft 24 has pivotally mounted thereon two arms or brackets 26 and 27 which provide mounting means for shafts 28 and 30 that carry feed rollers 32 and 34, the rollers preferably being composed of rubber or similar material. The feed rollers are rotated at a constant speed by a motor 36, through a train of reducing gears 38, 39 and 40, the motor being supported by studs 43 carried by the bracket 26.

Figure 3:
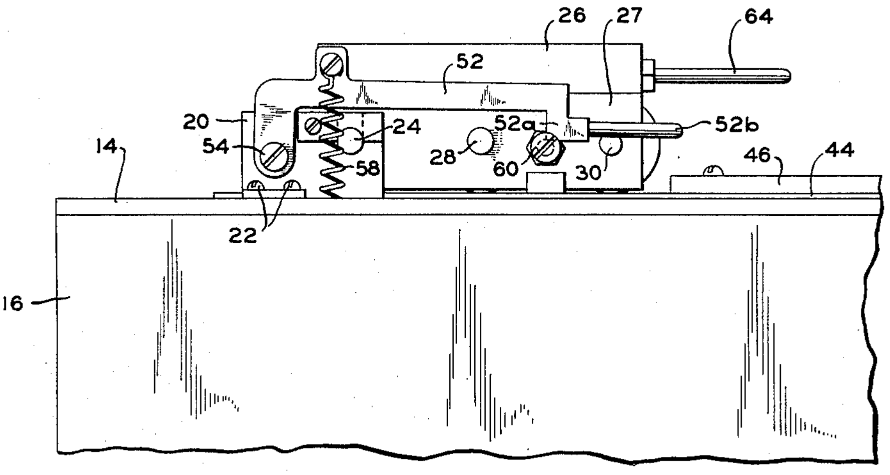
Fig. 3 is a fragmentary detailed end view, in elevation, of the feed roller mechanism.

The top plate 14 provides a bed or platen for the subject-matter sheets 44, one of which is seen in Fig. 3; these may comprise telegrams, letters, pictorial representations or other subject matter to be transmitted, and the sheets may be paper, cardboard or other material on which the subject matter appears, the sheets being inserted with the subject matter face downward. The subject-matter sheets are successively advanced by the feed rollers 32 and 34, and guide plates 46 maintain the sheets in alignment during scanning operations. The platen 14 has a scanning light aperture in the form of an elongated slot 15 that extends transversely across the platen to enable an oscillating scanning light beam 50, seen in Fig. 4, to fall on successive lines of the message sheet as it is advanced by the rollers 32 and 34. The roller 32 is slightly larger in diameter, and hence has a slightly greater peripheral speed, than the roller 34 in order to exert a slight tension on the message sheet and prevent it from wrinkling in its advancement across the platen 14.

Figure 2:
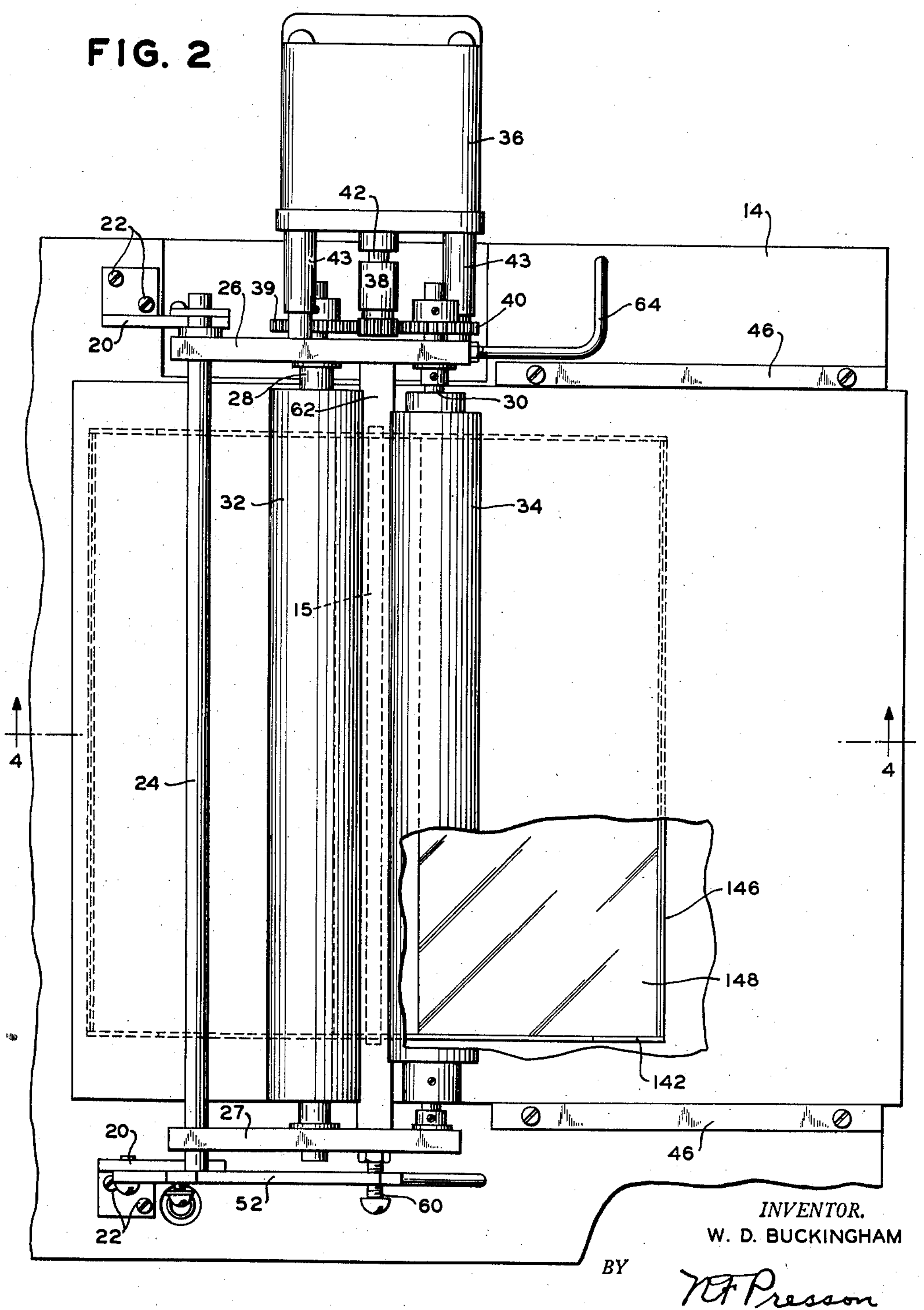
Fig. 2 is a top plan view of the feed roller mechanism in position for advancing a message sheet.

A lever 52, Figs. 2 and 3, pivotally mounted at 54 to one of the bracket members 20, has one end of a coil spring 58 secured thereto, the other end of the spring being anchored to the platen 14. This spring and the lever 52 act upon a stud 60 to hold the feed rollers of the assembly upwardly when the assembly is raised for the insertion of a copy sheet. A cross bar 62 is carried by the brackets 26 and 27; the cross bar is positioned over the slot 15 in the platen 14 and acts as a paper guide under which the message sheet 44 passes, and the underside of the bar is painted or coated white so that when there is no message sheet in the machine the scanning light beam 50 will be reflected back from the white surface of the bar to indicate a white background so that any copy being received at this time will be white instead of black. A handle 64 extends from the bracket member 26, Figs. 1 and 2, so that the feed roller assembly may readily be rocked upwardly to the position shown in Fig. 1 to facilitate the insertion of a message sheet. In this position, due to the different pivotal points of the lever 52 and the bracket members 26 and 27, the inner corner portion **52*a* (Fig. 3) of the member 52 has engaged the stud 60, and the tension of the spring 58 acting upon the lever 52 holds the feed roller assembly in its raised position until the handle 52*b* of the lever is manually raised slightly to disengage 52*a* and 60** and permit the assembly to be returned to its sheet-feeding position.

Referring again to Fig. 1, there is shown a synchronous drive motor 70 for driving the rocking or oscillatory reflector of the optical system, and a motor 72 for rotating a light-chopper disk 74. A tungsten arc lamp 76 positioned below the light-chopper disk provides a small round spot of scanning light. The light-chopper motor is mounted on a bracket 78 secured to a wall portion of the casing. The drive motor 70 is mounted on and clamped to a plate 80, as by screws. The plate 80 carries adjusting screws 84 whereby the plate may be adjusted vertically to the proper angle to direct the scanning light beam 50. The motor 70 drives, through worm gears 86 and 87, a cross shaft 89 that is rotatably mounted in a bracket 92 carried by the plate 80; a fly wheel 94 secured to the shaft 89 assists in maintaining the speed of the shaft constant.

Figures 5, 6, 7, 8:
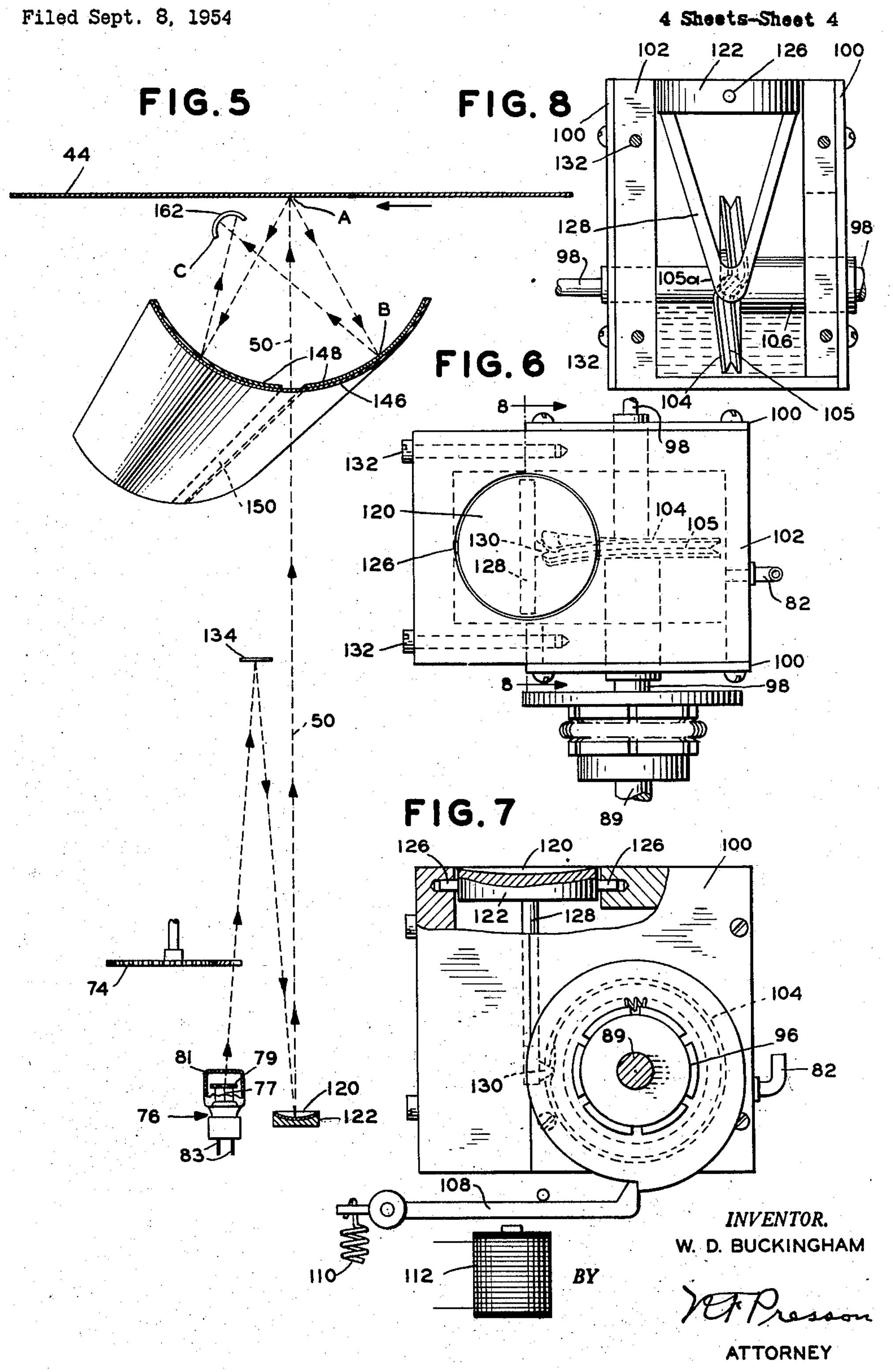
Fig. 5 is a diagrammatic view illustrating the scanning light optical system.
Fig. 6 is a top plan view of oscillating mirror mechanism employed in the optical system.
Fig. 7 is a side view of the mechanism of Fig. 6.
Fig. 8 is a sectional view taken along the line 8—8 of Fig. 6, showing details of the mirror oscillating mechanism.

The shaft 89 also carries a friction clutch 96 which, as shown in Figs. 6 and 8, controls the rotation of a flutter camshaft 98. The friction clutch may be of any suitable known type, for example, as disclosed in Noxon et al. Patent No. 2,212,548, issued August 27, 1940. The shaft 98 is rotatably mounted in the side plates 100 of an oil-tight casing 102 which encloses a circular flutter cam 104 having a cam groove 105. The cam is carried by a sleeve 106 which is secured, as by a screw, to the shaft 98. The friction clutch 96 has associated therewith a stop arm 108, seen in Fig. 7, the stop arm being urged upwardly by a spring 110 into latching position and releasable by energization of an electromagnet 112 to enable the flutter cam to rotate in response to a start or phasing signal received over the line from a facsimile recording station in known manner.

A spherical mirror or reflector 120 is cemented in a cup 122 that is pivotally mounted in the top of the casing 100 by means of pins 126. A V-shaped arm 128 has the upper ends thereof secured to the cup 122, and the lower end of the arm carries a cam follower pin 130 which tracks in the spiral cam groove 105 so that as the cam rotates the reflector 120 is rapidly rocked back and forth through a limited angle as determined by the length of each scanning line at the message sheet. The cam track 105 has a laterally curved quick-return portion **105*a*, Fig. 8, which extends through an arc of approximately 18° of the periphery of the circular cam, the remainder of the groove extending through an arc of approximately 342°. The cam and its follower are partially immersed in a bath of oil within the casing 102, a filling tube 82 being provided for the oil. Preferably, and as shown, the casing 102 is in two parts which are held together by machine screws 132, thereby to enable ready assembly or disassembly. Referring to Figs. 1 and 5, there is shown a fixed flat mirror 134 within a casing 135, Fig. 1, that is secured to the casing 16 by a bracket 136, the mirror being adjustable by screws 138 to direct the scanning light beam from the lamp 76 onto the center of the spherical mirror 120, the light source being located so as to be substantially at the optical center of curvature of the spherical reflector, that is, the distance from the lamp to the mirror 134 and thence to the reflector 120** equals substantially the radius of curvature of the reflector.

Any suitable means may be provided for generating a blanking pulse in order to suppress transmission of the facsimile pickup signals during the return sweep of the scanning beam. For example, a rotatable cam 91 preferably of insulating material is adjustably mounted on and rotated by the shaft 98 and has a cam lobe 93 that extends through an arc of 18° which is equal to that of the return portion **105*a* of the cam track 105. As the cam rotates a pair of normally open contact springs 95 are closed by the lobe 93** to produce a blanking pulse having a time duration corresponding to that of the return interval. This blanking pulse may be used to control the transmitting circuit in various ways to suppress transmission during this period, for example, to control a blanking modulator circuit as disclosed in the pending application of L. G. Pollard et al., Serial No. 261,461, filed December 13, 1951, now Patent No. 2,824,902, issued February 25, 1958 or to bias a rectifier to render it nonconductive as disclosed in the pending application of R. J. Wise, Serial No. 261,560, filed December 13, 1951, now Patent No. 2,721,231, issued October 18, 1955.

Figure 4:
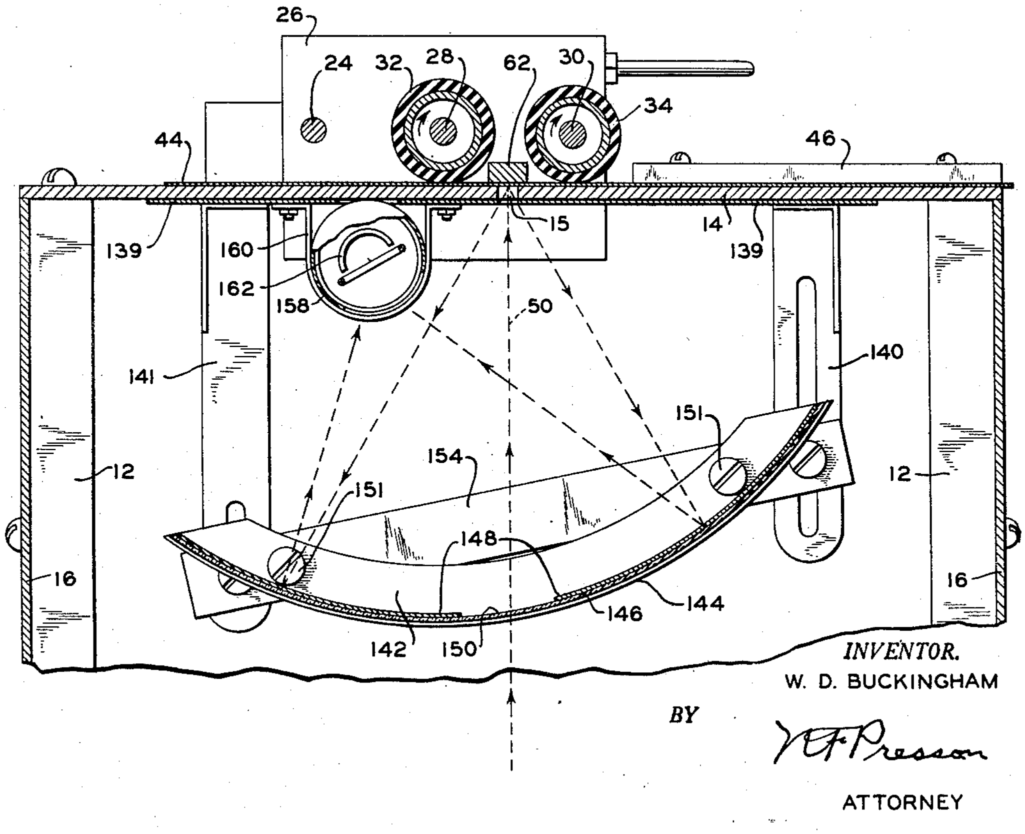
Fig. 4 is a section taken along the line 4—4 of Fig. 2, showing certain details of the scanning light beam systems.

The platen 14 has secured thereto plates 139, Figs. 1 and 4, which carry depending slotted brackets 140 and 141. These brackets support two arcuate plates 142 having lip portions 144 which hold a cylindrical reflector 146 that has coated reflecting portions 148 thereon (Fig. 4) and a transversely extending light pervious strip or slot 150, Figs. 4 and 5. The arcuate plates 142 are fastened by screws 151 to cross bars 154 which are supported by wing nuts 152, Fig. 1, received within the slotted portions of the brackets 141, and the cross bars 154 are held by wing nuts 156 received within the slotted portions of the bracket members 140 and 141. The slots in the members 140, 141 and 154 enable adjustment of the cylindrical reflector to the proper position hereinafter described. A phototube 158, for example, a caesium cell, is secured to the underside of the plate 14 by straps 160 seen in Fig. 4, the phototube preferably having an elongated electrode 162 which is responsive to variations in reflected light falling thereon for generating minute currents which control an amplifier to produce facsimile message signals in accordance with the tonal densities of the subject matter on the message sheet as elemental areas thereof are successively scanned by the oscillating light beam.

Preferably, and as illustrated in Fig. 5, the source of light 76 is a tungsten concentrated arc lamp in which the electrodes are enclosed in a gas-filled glass envelope 81. The cathode 77 comprises a fine tungsten wire having formed on the end thereof a minute ball, the diameter of the ball corresponding approximately to the desired diameter of the light spot which falls on the subject matter sheet. The anode 79 is composed of a suitable metal or alloy having a high melting point, for example, molybdenum, tantalum and tungsten; zirconium metal may be employed in which case it also acts as a getter to clean up chemically active gases in the tube, the electrode being disk-shaped and having a small round opening or sight therein properly aligned with respect to the ball tip of the cathode. For scanning with a light spot of approximately 0.008 inch in diameter, the tungsten ball will have a diameter of approximately 8 mils, and the central opening in the anode disk will have a diameter of from 25 to 30 mils. Such a lamp may be formed by inserting the electrode assembly within the glass envelope 81 of the tube 76, the tungsten wire 77 having a diameter of approximately 4 mils, with the end of the tungsten wire extending to the opening in the disk 79. The envelope is exhausted to about one-half micron pressure, and the lamp is heated in an oven while maintaining a vacuum thereon, and is bombarded in a high frequency coil while on the vacuum pump. A suitable gas such as argon is admitted to a pressure of substantially one atmosphere. The lamp terminal posts 83 are then connected to a forming circuit in which the positive conductor of the circuit is connected to the tungsten wire of the lamp and the negative conductor of the circuit is connected to the plate of the lamp. Current of sufficiently high voltage to start and maintain an arc between the end of the tungsten wire and the zirconium disk is applied until a small ball of tungsten forms on the end of the wire which at this time is operating as an anode, and until the ball reaches a diameter of approximately 8 mils.

The envelope of the lamp is again exhausted to about one-half micron pressure. The envelope is again filled with argon or other suitable gas to a pressure such that at operating temperatures it will be approximately one atmosphere, and the envelope is sealed off. Preferably the lamp is of the type disclosed in an application of W. D. Buckingham and R. C. Aldridge for a Tungsten Concentrated Arc Lamp, Serial No. 454,779, filed concurrently herewith, now Patent No. 2,882,434, issued April 14, 1959.

In its circuit in the scanning system, the tungsten wire 77 comprises the cathode and the disk 77 the anode. The small tungsten ball reaches incandescent temperatures, and in operation the ball point will operate at a temperature of about 2800° to 3000° Kelvin, which provides a brilliant point source of light. When starting the lamp a higher voltage is employed to establish the arc between the ball point and the anode, after which a lower voltage will maintain the lamp in operating condition. The voltage drop across the lamp when argon is used as a filling gas is approximately 26 volts, and the lamp operates with a low current of approximately 90 milliamperes direct current. A ballast resistance in series with the lamp is required since the lamp has a negative volt-ampere characteristic. The power required for the lamp is approximately two or three watts. While the lamp requires but two terminal posts 83 for the starting and running circuit, a third terminal may be used if desired for polarizing the lamp so that it will be inserted with the proper polarities applied to the cathode and anode elements.

The light beam from the lamp is interrupted by the chopper disk 74 to generate a carrier frequency that subsequently is modulated in accordance with the amount of light reflected from the scanned subject matter. Any suitable carrier frequency may thus be provided, for example, of the order of several thousand cycles per second. The light beam thus interrupted by the chopper disk 74 is reflected by flat fixed mirror 134 onto the spherical mirror 120. A voltage regulator is not required with the tungsten concentrated arc lamp since the light output remains substantially constant notwithstanding considerable variation in the supply voltage applied to the lamp.

Referring to the spherical reflector 120, this may comprise a conventional concave spectacle lens which is coated on the concave side with aluminum, silver or other reflecting material vaporized onto the surface to provide a front surface mirror. A thin surface coating of aluminum oxide or silicon monoxide is vaporized over the reflecting surface to produce a harder surface and thus minimize or prevent scratching. Such a mirror may be produced at a very low cost in contrast to expensive achromatic lenses heretofore regarded as necessary in optical scanning systems. In a commercial form of the present apparatus, the diameter of the mirror 120 is 36 millimeters, and its focal length is of the order of 11 inches which represents the distance between the mirror and the reflecting surface of the message sheet at the point A, Fig. 5, being scanned. Since the focal length of the mirror is quite long relative to its diameter, spherical aberration effects are avoided.

In order to provide suitable definition in facsimile scanning, 100 scanning lines or more per linear inch are desirable. The drive motor 70 may, for example, have a speed of 1800 r.p.m., and with reducing gears 86 and 87 having a ratio of 5:1, this produces 360 oscillations of the light beam 50 per minute, the advancement of the message sheet across the platen being at a rate such that this scanning speed will produce approximately 100 scanning lines per inch. As the light beam is oscillated back and forth, scanning is effected only in one direction of movement of the beam, so that the return or retrace time of the beam after each scanning line largely represents lost time. In order to avoid this, a quick return time at the end of each scanning line is obtained by the use of the quick-return portion 105_a_, Fig. 8, of the flutter cam. This return time between successive scanning lines, as hereinbefore set forth, is only that required for the rotation of the flutter cam through an arc of approximately 18°, in contrast to the time required for the remainder of the cam groove which extends through an arc of approximately 342°; thus the return or retrace time of the light beam is effected in $\frac{1}{20}$ of a revolution of the flutter cam, the scanning light beam sweep being effected in the remaining $\frac{19}{20}$ of a revolution of the flutter cam. This causes the return or retrace operation to utilize but 5% of the time required for each line scanning cycle. This advantage is also applicable to optical scanning systems in facsimile recorder apparatus in which a modulated light beam travels back and forth across a light sensitive sheet for recording marks thereon in accordance with the facsimile signals received.

In the transmitter shown the quick return time of the scanning light beam enables facsimile message signals to be produced which are also adapted for use with recorders on which the recording sheet is mounted on a rotatable drum, the recording sheet being scanned either by a light beam or an electrical stylus along a helical path as the drum is rotated. This enables the return time of the scanning beam at the transmitter to be effected during that portion of the travel of a recording sheet when the adjacent marginal edges of the rolled sheet are passing the recording stylus or recording light beam, and thus the transmitting apparatus disclosed is adapted to be used either with a flat bed recorder or with a drum type recorder.

Referring again to Fig. 5, the cylindrical reflector may be composed of a cylindrical sheet which may comprise a methacrylate resin, such as "Plexiglas" or "Lucite," or other transparent material such as glass. The resin or the glass is coated with silver, aluminum or aluminum oxide to provide the cylindrical mirror surfaces 148. Before the cylindrical sheet is coated a longitudinal masking strip is applied to the surface thereby to provide a narrow transparent elongated area 150 through which the scanning light beam 50 passes during the scanning movement thereof. If desired the cylindrical reflector may be composed of a sheet of metal or other opaque material with the convex surface thereof polished or coated to provide good reflecting surfaces, and in this case the area 150 may comprise an elongated slot in the material and through which the scanning beam 50 passes. The cylindrical reflector disclosed has the characteristic in that the round scanning spot of light reflected from the surface of the message sheet at the point A is collected by the reflector and is focused as a line of light on the cathode 162 of the photocell 158, provided that the photocell and the illuminated line of the message sheet respectively are located at the conjugate foci of the reflector. This condition may be expressed as:

$$\frac{1}{F}=\frac{1}{AB}+\frac{1}{BC}$$

where F is the focal length of the cylindrical mirror; AB is the distance from the subject matter sheet to any point B on the reflector on which the reflected light falls; and BC is the distance from this point to the photocell. In the embodiment illustrated the radius of curvature of the cylindrical mirror is five inches, and its local length is 2½ inches.

The foregoing arrangement results in a substantial increase in efficiency, since if a moving spot of light is reflected onto a photocell, different areas of the cathode structure may exhibit different degrees of sensitiveness and hence non-uniform response for the same tonal density of the subject matter scanned, whereas in the present arrangement the light is focused along a line that extends substantially over the entire length of the exposed sensitive area of the photocell cathode, and thus provides a uniform response for the same tonal density and also an increase in the total quantity of reflected light from the subject-matter copy that can fall on the photocell. Whether the photocell structure comprises a single cathode element, preferably an elongated cathode, or whether several smaller photocells are employed in series to form an elongated light sensitive area, is immaterial since the light will fall equally on the light sensitive area of the structure, and will vary in density depending only upon the density of the subject matter at the time being scanned. As hereinbefore disclosed and as illustrated in Fig. 1, the cylindrical reflector is readily adjustable to the proper position to insure that the photocell and the place where the spot of light falls on the subject-matter sheet are at the conjugate foci of the reflector.

The embodiment disclosed herein is for the purpose of illustrating the principles of the invention and one mode of application thereof, and various changes and modifications may be made without departing from the spirit of the invention which is not to be regarded as limited except as indicated by the scope of the appended claims.

What is claimed is:

1. Facsimile optical scanning apparatus comprising a platen on which a sheet may be advanced, a scanning light source and means for oscillating the light beam back and forth across the sheet, and sheet-feeding means comprising a bracket structure and a pair of feed rollers rotatably mounted therein and adapted to bear on the sheet, a motor mounted on the bracket structure for rotating the feed rollers, said bracket structure being pivotally mounted at one end thereof whereby the structure manually may be rotated upwardly to facilitate placing a sheet on the platen for a scanning operation.

2. In a facsimile transmitter in which the subject matter on a message sheet is scanned by a scanning light beam that periodically sweeps across the sheet at a scanning line position as the subject-matter sheet is advanced, pickup photocell means having electrode structure forming a light-sensitive area responsive to the scanning light reflected from the subject-matter sheet, means effected in any scanning line position of the light beam for increasing the total quantity of the reflected light that falls on said light-sensitive area comprising a substantially cylindrical reflector for collecting the scanning light reflected from the sheet and reflecting the light onto said light-sensitive area, and including means for positioning said cylindrical reflector and the illuminated surface of the sheet and the photocell device relative to each other so that the illuminated surface and the photocell means respectively are located substantially at the conjugate foci of the cylindrical reflector to cause the light reflected thereby to be focused along a line extending over substantially the entire length of said light-sensitive area of the photocell electrode structure.

3. Apparatus according to claim 2, in which said pickup photocell means has electrode structure forming an elongated light-sensitive area extending substantially parallel to the axis of the cylindrical reflector.

4. Apparatus according to claim 2, including a light source and means comprising a spherical reflector for focusing the light beam from said source to cause a spot of light to fall on the message sheet for scanning the subject-matter thereon, means for rapidly rocking the reflector to cause the scanning beam to oscillate across the sheet as it is advanced, the configuration of the reflector being such that its focal length is sufficiently long relative to its diameter to substantially prevent spherical aberration, the reflector being so positioned that its focus is located substantially at the illuminated surface of the subject-matter sheet, said light source comprising a circular incandescent light-emitting area having a diameter approximately equal to the diameter of the scanning spot of light that falls on the subject-matter sheet, the light source being located substantially at the optical center of curvature of the spherical reflector.

5. In a facsimile transmitter, a platen across which a subject-matter sheet may be advanced for scanning purposes, said platen having a scanning light aperture therein, means for advancing the sheet past said aperture at a predetermined rate, a light source and means for focusing the light beam from said source through said aperture to cause a spot of light to fall on said sheet for scanning the subject-matter thereon, means for causing the scanning beam periodically to sweep across the sheet as it is advanced, pickup photocell means having electrode structure forming a light-sensitive area responsive to the scanning light reflected from the subject-matter sheet, and means for increasing the total quantity of the reflected light that falls on said light-sensitive area comprising a substantially cylindrical reflector mounted with its concave side facing the scanning aperture in said platen for collecting the scanning light reflected from the sheet and reflecting the light onto said light-sensitive area, said cylindrical reflector having a transversely extending area thereof through which said scanning beam may pass, said cylindrical reflector and the illuminated surface area of the sheet and the photocell being so positioned relative to each other that in any scanning line position of the light beam the light reflected by the cylindrical reflector is focused along a line extending over substantially the entire length of said light-sensitive area of the photocell structure.

6. In a facsimile transmitter, a platen across which a subject-matter sheet may be advanced for scanning purposes, said platen having a scanning slot therein, means for advancing the sheet past said slot at a predetermined rate, a light source and means comprising spherical reflector means for focusing the light beam from said source through said slot to cause a spot of light to fall on said sheet for scanning the subject-matter thereon, means for rapidly actuating the reflector means to cause the scanning beam to oscillate back and forth across the sheet as it is advanced, pickup photocell means having electrode structure forming a light-sensitive area, and means for increasing the total quantity of the reflected light that falls on said light-sensitive area comprising a substantially cylindrical reflector mounted with its concave side facing the scanning slot in said platen for collecting the scanning light reflected from the sheet and reflecting the light onto said light-sensitive area, said cylindrical reflector and the illuminated surface area of the sheet and the photocell being so positioned relative to each other that in any scanning position of the light beam the light reflected by the cylindrical reflector is focused along a line extending over substantially the entire length of said light-sensitive area of the photocell structure, said cylindrical reflector comprising a curved sheet of light-transmissive material with a surface coating treated to form a mirror for reflecting said light from the subject-matter sheet onto the photocell structure, the reflector having an uncoated transversely extending area through which said oscillating light beam may pass.

7. Apparatus according to claim 6, in which said cylindrical reflector comprises a curved sheet composed of a transparent resin having the concave side thereof coated to form a mirror for reflecting said light from the subject-matter sheet onto the photocell structure, the resin sheet having an uncoated transversely extending area through which said oscillating light beam may pass.

8. In a facsimile transmitter, a platen across which a subject-matter sheet may be advanced for scanning purposes, said platen having a scanning slot therein, means for advancing the sheet past said slot at a predetermined rate, a light source and means comprising spherical reflector means for focusing the light beam from said source through said slot to cause a spot of light to fall on said sheet for scanning the subject-matter thereon, means for rapidly actuating the reflector means to cause the scanning beam to oscillate back and forth across the sheet as it is advanced, pickup photocell means having electrode structure forming a light-sensitive area, and means for increasing the total quantity of the reflected light that falls on said light-sensitive area comprising a substantially cylindrical reflector mounted with its concave side facing the scanning slot in said platen for collecting the scanning light reflected from the sheet and reflecting the light onto said light-sensitive area, said cylindrical reflector and the illuminated surface area of the sheet and the photocell being so positioned relative to each other that in any scanning position of the light beam the light reflected by the cylindrical reflector is focused along a line extending over substantially the entire length of said light-sensitive area of the photocell structure, said cylindrical reflector comprising a curved sheet of opaque material having the concave side thereof treated to form a mirror for reflecting said light from the subject-matter sheet onto the photocell structure, said sheet having a transversely extending slotted area therein through which said oscillating light beam may pass.

References Cited in the file of this patent

UNITED STATES PATENTS

| | | |
|---|---|---|
| 1,915,385 | Replogle | June 27, 1933 |
| 1,979,722 | Zworykin | Nov. 6, 1934 |
| 2,176,680 | Nichols | Oct. 17, 1939 |
| 2,262,584 | Herriott | Nov. 11, 1941 |

FOREIGN PATENTS

| | | |
|---|---|---|
| 536,645 | Great Britain | May 22, 1941 |
| 572,026 | Germany | Mar. 9, 1933 |

UNITED STATES PATENT OFFICE

CERTIFICATE OF CORRECTION

Patent No. 2,903,512 September 8, 1959

William D. Buckingham

It is hereby certified that error appears in the printed specification of the above numbered patent requiring correction and that the said Letters Patent should read as corrected below.

Column 7, line 71, for "effected" read -- effective --.

Signed and sealed this 5th day of April 1960.

(SEAL)
Attest:

KARL H. AXLINE
Attesting Officer

ROBERT C. WATSON
Commissioner of Patents